(12) United States Patent
Prikryl

(10) Patent No.: US 6,549,511 B1
(45) Date of Patent: Apr. 15, 2003

(54) OPTICAL DISK MEDIUM HAVING FEATURES FOR RADIAL TILT DETECTION AND APPARATUS FOR MEASURING RADIAL TILT

(75) Inventor: Ivan Prikryl, Loveland, CO (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/256,791

(22) Filed: Feb. 24, 1999

(51) Int. Cl.[7] .................................................. G11B 7/24
(52) U.S. Cl. ..................................................... 369/275.4
(58) Field of Search ........................................ 369/275.4

(56) References Cited

U.S. PATENT DOCUMENTS

| | | | | |
|---|---|---|---|---|
| 4,310,916 A | * | 1/1982 | Dil .............................. | 369/109 |
| 4,325,135 A | * | 4/1982 | Dil et al. ..................... | 369/110 |
| 4,423,502 A | * | 12/1983 | Dil .............................. | 369/275 |
| 4,663,751 A | * | 5/1987 | Kaku et al. ................... | 369/46 |
| 4,866,688 A | | 9/1989 | Ohtake et al. | |
| 4,949,330 A | * | 8/1990 | Pasman et al. .......... | 369/275.1 |
| 5,090,007 A | * | 2/1992 | Bulthuis ................. | 369/275.4 |
| 5,602,824 A | * | 2/1997 | Ooki et al. ............. | 369/275.4 |
| 5,657,303 A | | 8/1997 | Namoto et al. .......... | 369/44.32 |
| 5,699,340 A | | 12/1997 | Lee et al. .................... | 369/112 |
| 5,724,339 A | * | 3/1998 | Ogawa .................... | 369/275.4 |
| 5,808,985 A | | 9/1998 | Gerber et al. ............ | 369/44.32 |
| 5,859,820 A | | 1/1999 | Nagasawa et al. | |
| 5,978,332 A | * | 11/1999 | Itakuraa et al. .......... | 369/44.32 |

FOREIGN PATENT DOCUMENTS

| | | | |
|---|---|---|---|
| EP | 0099576 A2 | 2/1984 | |
| EP | 0886266 A2 | 12/1998 | |

* cited by examiner

*Primary Examiner*—Aristotelis M. Psitos
(74) *Attorney, Agent, or Firm*—Augustus W. Winfield (57) ABSTRACT

An optical disk medium has a data surface with grooves and lands behind a transparent substrate. Periodically, along radial lines, tilt measurement features are provided in the data surface, wherein the height of the grooves and lands is abruptly changed, preferably over a short circumferential length. For example, along the radial lines, the height of a groove (over a short length) may be changed to the height of a land and the height of a land (over a short length) may be changed to the height of a groove. The optical system and the optical disk medium are designed so that when the focused laser spot is centered on a groove, a radial push-pull tracking error signal is zero even if the disk is tilted. If the focused laser spot is centered on a land, the tracking error signal varies when the disk is tilted. As a result, when the focused laser spot passes over a tilt measurement feature, an abrupt step in the tracking error signal provides a measure of the magnitude and direction of tilt. The tilt measurement features have little effect on the data signal, and little effect on the filtered tracking error signal and the filtered focus error signal.

2 Claims, 7 Drawing Sheets

OPTICAL DISK MEDIUM HAVING FEATURES FOR RADIAL TILT DETECTION AND APPARATUS FOR MEASURING RADIAL TILT

FIELD OF INVENTION

This invention relates generally to optical disks and more specifically to an optical disk that includes physical features suitable for use in detecting radial tilt of the disk relative to an ideal plane.

BACKGROUND OF THE INVENTION

Optical disks, for example, compact disks (CD), require precise focusing of an optical beam onto a data surface. One or more light beams (typically from a laser diode), illuminate one or more spots on the disk, and are reflected back into an optical head. In addition to information about recorded data, the reflected light beams generally may also carry information about tracking error (how well a beam is centered on a data track), and focus error (how well a beam is focused onto the data surface). Typically, the data surface of an optical disk is protected by a transparent substrate on the side that is illuminated by the laser. In general, whenever an illuminating beam must pass through the substrate to reach the data surface, disk tilt degrades the focus quality of the illuminating beam. Typically, for the data densities involved in CD media, tilt detection and compensation are not required. However, for higher data densities, for example, for Digital Versatile Disks (DVD), radial tilt detection and compensation may be necessary. Note that tilt may have a radial component and a tangential component, but the radial component is typically much larger (and therefore of more concern) than the tangential component.

Some optical disk drives use a separate light beam for radial tilt measurement. See, for example, U.S. Pat. Nos. 5,657,303 and 5,699,340. In order to simplify the optical head, there is a need for a radial tilt measurement system that uses the same light beam that is used for reading the data. However, the tilt information should not interfere with the resulting data signal. One approach to providing radial tilt information in the data reading beam is used by the Advanced Storage Magneto Optic (ASMO) format. ASMO media is preformatted with permanent (embossed) headers. Each header starts with tilt measurement marks, formed into the walls of a groove defining a track. The tilt measurement information does not interfere with the data because data and headers do not coexist at the same place on the disk. However, rewritable DVD media do not use permanent headers. There is a need for radial tilt detection features, in optical media that do not use permanent headers, that will not interfere with the optical data signal. Another approach is to provide multiple tracking error signals. See, for example, U.S. Pat. No. 5,808,985. There is need for radial tilt detection without requiring any modification to conventional optical heads.

SUMMARY OF THE INVENTION

An optical disc medium in accordance with the invention has a recording thin film structure (data surface) with grooves and lands behind a transparent substrate. Periodically, along radial lines, radial tilt measurement features are provided in the data surface, wherein the height of the grooves and lands are changed, preferably over a short circumferential length. For example, along the radial lines, the height of a groove (over a short length) may be raised to the height of a land and the height of a land (over a short length) may be reduced to the height of a groove. The optical disk medium is designed in conjunction with the optical system of the drive so that when the focused laser spot is centered on a groove, a tracking error signal (for example, radial push-pull signal) is zero even if the disk is radially tilted. If the focused laser spot is centered on an area having a height that is different than the height of a groove, for example a land, the tracking error signal varies when the disk is radially tilted. As a result, when the focused laser spot passes over a tilt measurement feature, an abrupt step in the tracking error signal provides a measure of the magnitude and direction of radial tilt. The abrupt steps are removed from the tracking error signal by existing low-pass filtering. The tilt measurement features have negligible effect on the data signal, and negligible effect on filtered tracking error and focus error signals. No changes are required for the drive optical system. The only drive change required is additional signal processing of the tracking error signal to detect abrupt steps.

Some proposed formats (for example, DVD-RAM) use a format called single-spiral groove and land recording, in which each spiral groove completes one revolution of the disk and then ends at the beginning of a spiral land. Each spiral land completes one revolution of the disk and then ends at the beginning of a spiral groove. Data is recorded on the grooves and on the lands. The method of using a change in the groove height to measure radial tilt is also applicable to single-spiral groove and land recording.

DETAILED DESCRIPTION OF THE PREFERRED EMBODIMENT OF THE INVENTION

Figure 1A:
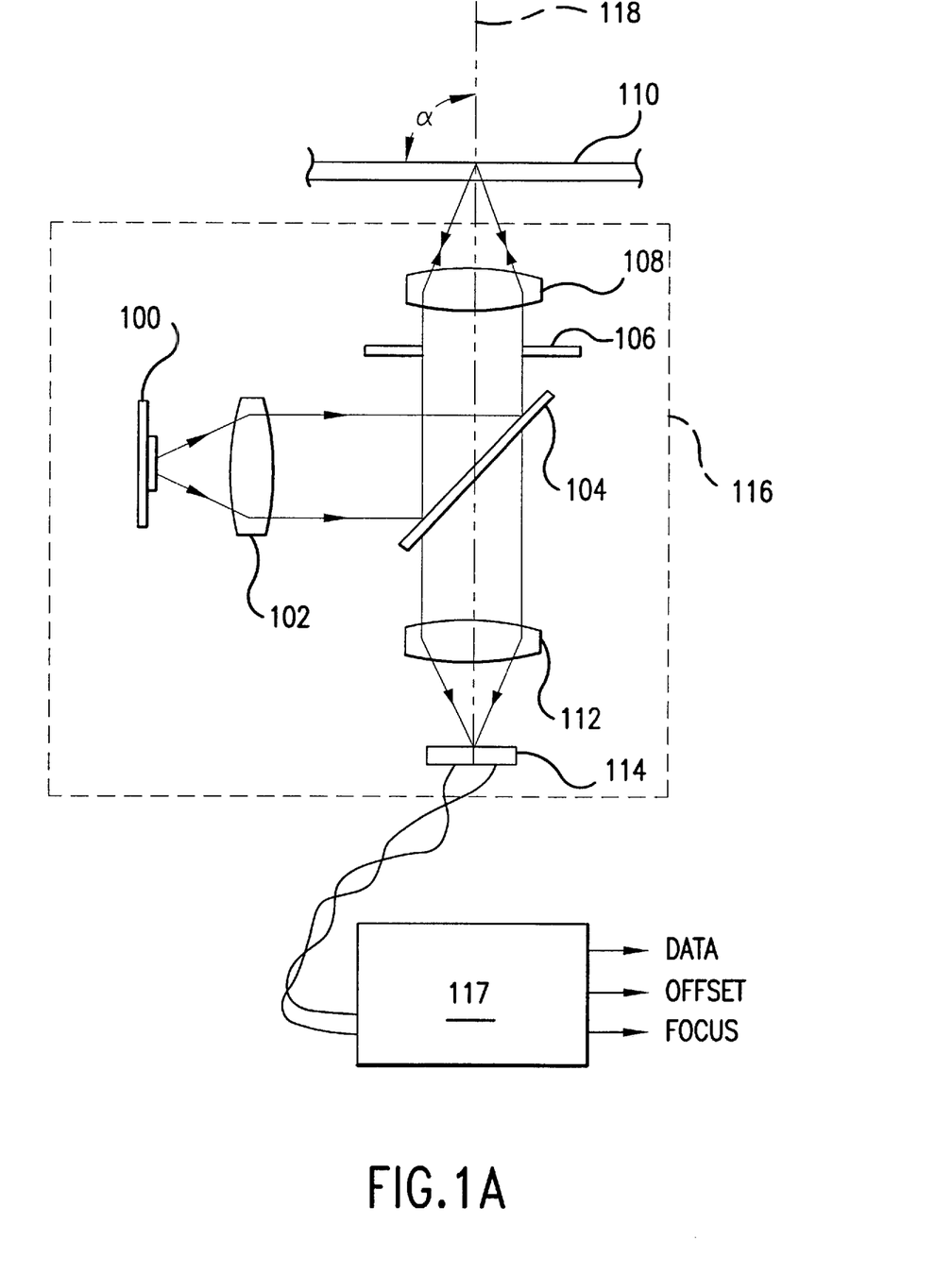
FIG. 1A is a block diagram side view of an example optical head and disk within an optical disk mechanism.

FIG. 1A illustrates an optical disk system. The system in FIG. 1A depicts representative components in a manner suitable to illustrate the invention within the context of a drive, but the system of FIG. 1A may not accurately depict any actual optical disk system, and there are many variations and many different configurations. In FIG. 1A, a laser diode 100 emits coherent but uncollimated light. The light passes through a collimation lens 102, is reflected from a partially-reflecting mirror 104, passes through an aperture 106, through a focusing lens 108, and is focused onto a data surface within an optical disk 110. Light reflected from the data surface in the disk 110 passes through partially-reflecting mirror 104, through a focusing lens 112, and is detected by a detector array 114. Some or all of the optical components (100, 102, 104, 106, 108, 112, and 114) may be mounted into an assembly referred to as an optical head (reference 116). An electronic signal processing system 117 receives signals from the detector array 114 and derives various signals, such as a data signal, a tracking error signal, and a focus error signal.

In FIG. 1A, dashed line 118 represents the optical axis or centerline of the optical system. In FIG. 1A, angle α is the angle between the optical axis and the plane of the illuminated area of the disk. Ideally, the plane of the area on the disk 110 that is illuminated by the focused laser spot is orthogonal to the optical axis 118. That is, angle α should be ninety degrees. However, the disk is not perfectly flat, and is subject to dynamic forces, so that angle α slightly varies from ninety degrees during operation. This patent document is primarily concerned with measurement of radial disk tilt, of the illuminated area of the disk, relative to the optical axis of an optical head. In particular, disk 110 includes physical features that enable measurement of disk tilt without requiring a separate light beam, with negligible effect on the data signal, and without requiring changes to the design of the optical head.

Figure 1B:
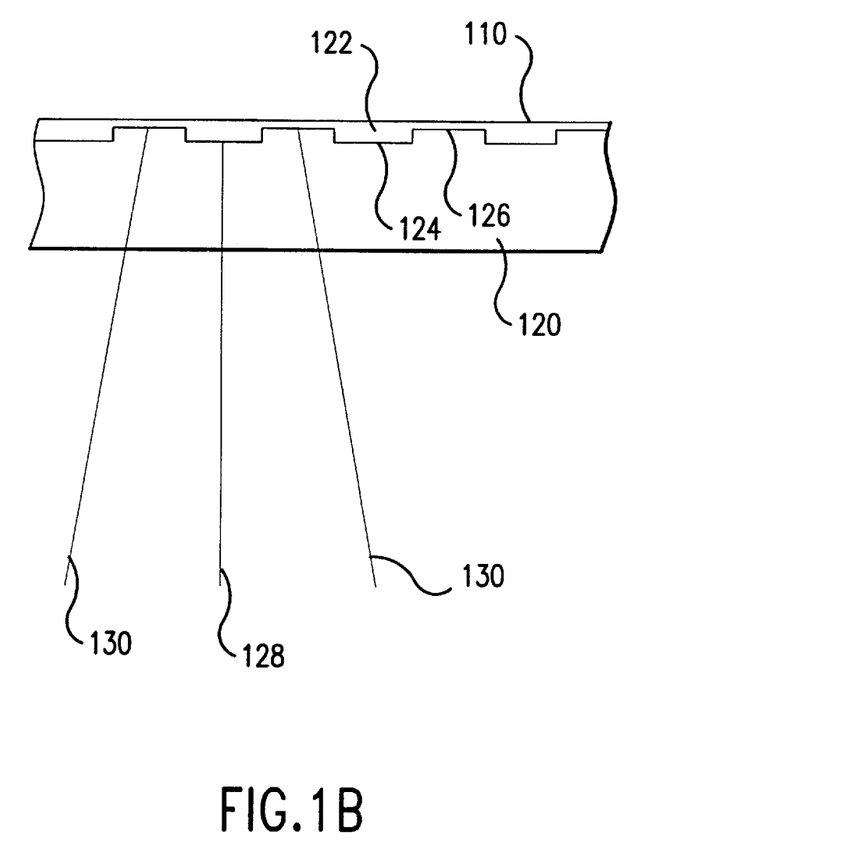
FIG. 1B is an expanded view of part of the disk of FIG. 1A.

FIG. 1B illustrates an expanded cross-section view of the optical disk 110. In FIG. 1B, disk 110 includes a substrate 120. Grooves are formed onto one surface of the substrate 120. The grooved surface is coated with a recording thin film structure to form a data surface, and covered by a protective layer 122. Binary data are encoded as marks of contrasting reflectance, or by pits and lands that affect reflectance by changing the phase of the reflected light. The light reflecting data surface comprises grooves 124 and lands 126. In FIG. 1B, the definition of a "groove" is as seen on the surface of the substrate where the recording thin film structure is formed. That is, as seen by the optical head, a "groove" is closer to the optical head than a land. In the following discussion, a groove is referred to as having a depth, in the sense that a groove is physically formed into a surface of a substrate and a land represents the original surface of the substrate. The focused laser spot on an optical disk typically has a central area of relatively high intensity, and several side lobe rings having a much lower intensity. The central area of high intensity has an overall diameter sufficiently large such that when the center of the spot is centered on a groove, some light falls onto each adjacent land. Accordingly, in FIG. 1B, light ray 128 is depicted as being on the optical axis of a focused beam directed onto the center of a groove, and light rays 130 at the outer edges of the focused spot are depicted as being directed onto the centers of lands. In the following discussion, data is assumed to reside on the surface of grooves, but in general, data may reside on lands, or on both lands and grooves. FIG. 1B illustrates a single sided medium. The invention is equally applicable to double sided media, in which effectively two substrates are bonded at the data surfaces.

Figure 1C:
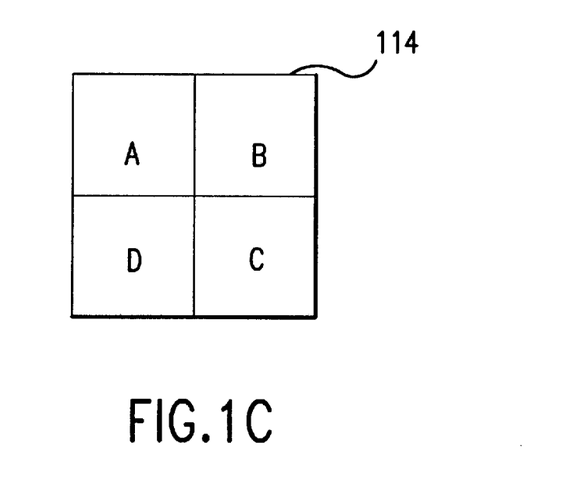
FIG. 1C is an expanded plan view of a detector illustrated in FIG. 1A.

FIG. 1C illustrates a plan view (orthogonal to the orientation depicted in FIG. 1A) of the detector array 114. The light received at the surface of the detector array is not uniform, but instead comprises interference patterns, resulting in an intensity distribution. Ideally, when the focused laser spot is centered on a track (groove or land), the interference pattern on the detector array 114 is symmetrical. In FIG. 1C, array 114 is divided into four quadrants. Typically, a data signal is obtained as the sum of the signals from each of four detector quadrants (A+B+C+D). If the focused laser spot is not centered on a groove, more of the reflected light may come from an adjacent land. As a result, the intensity distribution on the detector array may become asymmetrical, so that one half of the sensor array (for example, quadrants A and B), may receive a different light intensity distribution than the other half. A differential signal such as (A+B)–(C+D) is used to measure the degree to which the focused laser spot is radially offset from the center of a track (groove or land). This tracking error signal is commonly called the Radial Push-Pull (RPP) signal. In systems incorporating the present invention, a radial push-pull tracking error signal is used to additionally provide a measurement of radial tilt.

Figure 2:
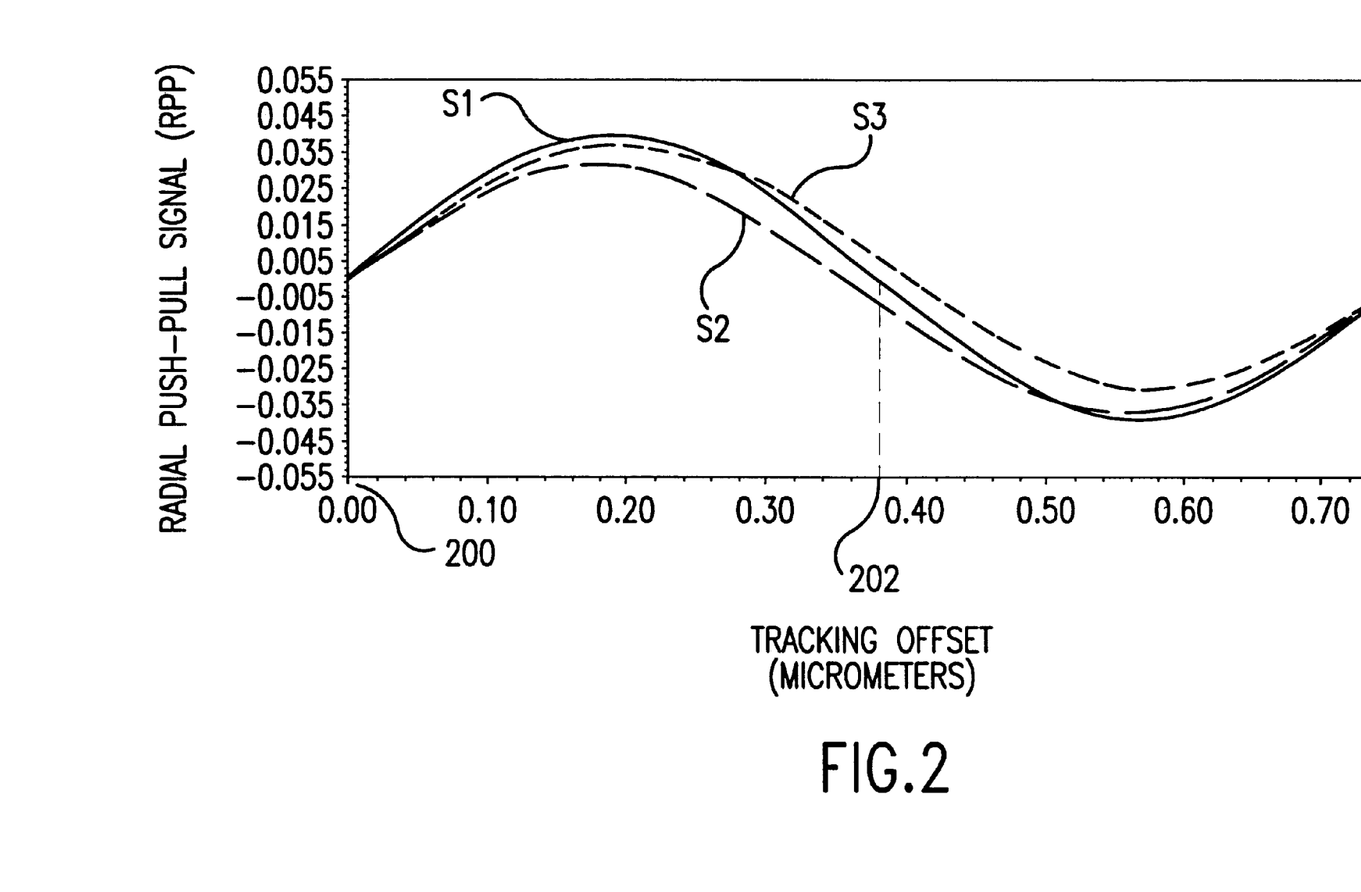
FIG. 2 is graph of a radial push-pull signal magnitude as a function of radial offset.

FIG. 2 illustrates the magnitude of RPP as a function of radial offset of the center of the laser spot from the center of a groove, for one particular system. Line S1 represents the magnitude of RPP with no disk tilt. Line S2 represents the magnitude of RPP with a radial tilt of +12 milliradians (α=π/2+0.012 radians). Line S3 represents the magnitude of RPP with a radial tilt of −12 milliradians (α=π/2−0.012 radians). The system generating the RPP signal illustrated in FIG. 2 has a track pitch of 0.76 micrometers, so that when the focused laser spot is offset by 0.38 micrometers, the spot is centered on a land (reference 202). RPP as a function of radial offset in FIG. 2 has characteristics that are unique to the present invention. In particular, the system generating the RPP signal illustrated in FIG. 2 has been designed so that RPP is insensitive to radial tilt when the focused laser spot is centered on a groove (reference 200). That is, when the focused laser spot is centered on a groove, RPP is zero even if the optical disk is tilted. However, as illustrated in FIG. 2, when the focused laser spot is centered on a land (reference 202), RPP varies with tilt. In a system in accordance with the invention, the height of grooves is occasionally changed, thereby providing a measurable step in RPP if the disk is tilted, even if the spot is centered, without affecting the data signal.

When the focused laser spot is centered in a groove, and when the disk is not tilted, the spot on the recording thin film structure is symmetrical on the groove, the reflected light is centered in the aperture (FIG. 1A, 106), and the reflected light is centered on the detector array (FIG. 1A, 114). When the disk is tilted, the disk substrate 120 causes the focused laser spot to become asymmetrical on the groove due to an aberration called coma. The asymmetry of the focused spot on the data surface introduces an asymmetry of light distribution within the aperture, and asymmetry of light distribution on the detector array.

In addition, even without coma, radial disk tilt causes the entire reflected light pattern to shift within the aperture, causing one side of the reflected beam to be vignetted by the aperture. Coma and vignetting each change the intensity distribution on the detector array, and the changes can add or cancel. The present invention utilizes the fact that the vignetting effects and coma effects can mutually compensate or magnify each other in the RPP signal. As will described below, the net effects of coma and vignetting on RPP may be made to cancel, when the focused spot is centered on a groove, by a proper selection of groove parameters.

Many of the variables that affect asymmetry of light on the detector array due to coma, and asymmetry of light distribution within the aperture, are mostly controlled by system requirements or industry standards. For example, in the system generating the offset response illustrated in FIG. 2, the laser wavelength (650 nanometers), reflectance (0.2), track pitch (0.76 micrometers), and groove width (0.38 micrometers) are all selected to satisfy various system requirements or standards. For the system generating the offset response illustrated in FIG. 2, the aperture is round, and truncates the disk illuminating beam (which has a gaussian distribution) falling outside a boundary representing an intensity of 50% of the peak intensity at the center of the beam. However, one of the most important parameters that affects light distribution of the reflected beam within the aperture and on the detector array is the depth of a groove relative to the surface of a land. Recall that the focused spot is distributed over the width of a groove and onto the adjacent lands. Adjusting the groove depth causes the interference patterns on the detector array to change. For the system generating the offset response illustrated in FIG. 2, the depth of a groove (relative to the surface of a land) was empirically adjusted to a depth of 52 nanometers, in an optical modeling program, so that the net effect of coma on RPP was canceled by the net effect of vignetting by the aperture on RPP when the focused spot is centered on a groove. As a result, RPP is insensitive to radial tilt when the focused laser spot is centered on a groove (FIG. 2, reference 200) and has increased sensitivity to radial tilt when the focused spot is centered on a land (FIG. 2, reference 202). Note that for data recording on a land instead of a groove, it is possible to select the disk groove depth so that the RPP signal will be insensitive to radial tilt when the focused spot is centered on a land and will have increased sensitivity to radial tilt when the focused spot is centered on a groove. Alternatively, as will discussed further below, for single-spiral groove and land systems, it may be preferable to select groove depth so that the RPP signal is insensitive to radial tilt when the focused spot is centered between the center of a groove and the center of a land.

Figure 3A:
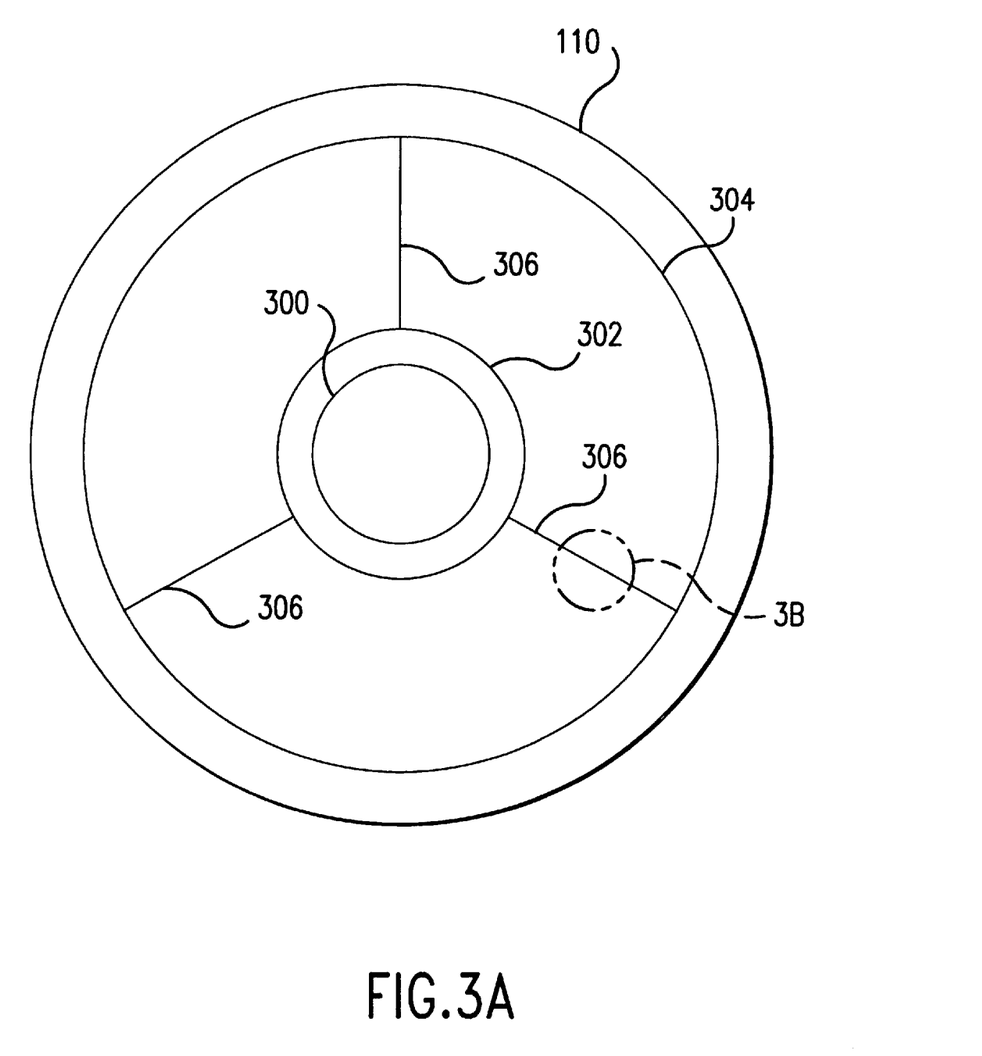
FIG. 3A is a plan view of an optical disk in accordance with the invention, illustrating features used for tilt detection.

FIG. 3A illustrates an optical disk 110 in accordance with the invention. The optical disk 110 includes an inner hole 300 for mounting. A data area extends from an inner radius 302 to an outer radius 304. The data area may comprise one spiral grove (separated by lands), multiple concentric circular grooves separated by lands, or other arrangements of grooves separated by lands. Radial tilt measurement features are provided along multiple radial lines 306, within the data area, wherein the height of grooves and lands are changed. For example, at a radius where there is normally a groove, the recording thin film structure may be fabricated to have the height of a land, and at a radius where there is normally a land, the recording thin film structure may be fabricated to have the height of a groove. FIG. 3A depicts three radial lines (306), but the number three is not a requirement. For some systems, having the groove height step up and down fewer than three times per revolution of the disk may be sufficient, and for other systems, more than three steps up and down per revolution of the disk may be preferable. Stepping the groove height to the height of a land and stepping land height to the height of a groove is convenient for manufacturability, but from FIG. 2, it can be seen that other steps in groove height and land height are acceptable. The only requirement is that the changes in height result in a detectable step in the RPP signal.

Figure 3B:
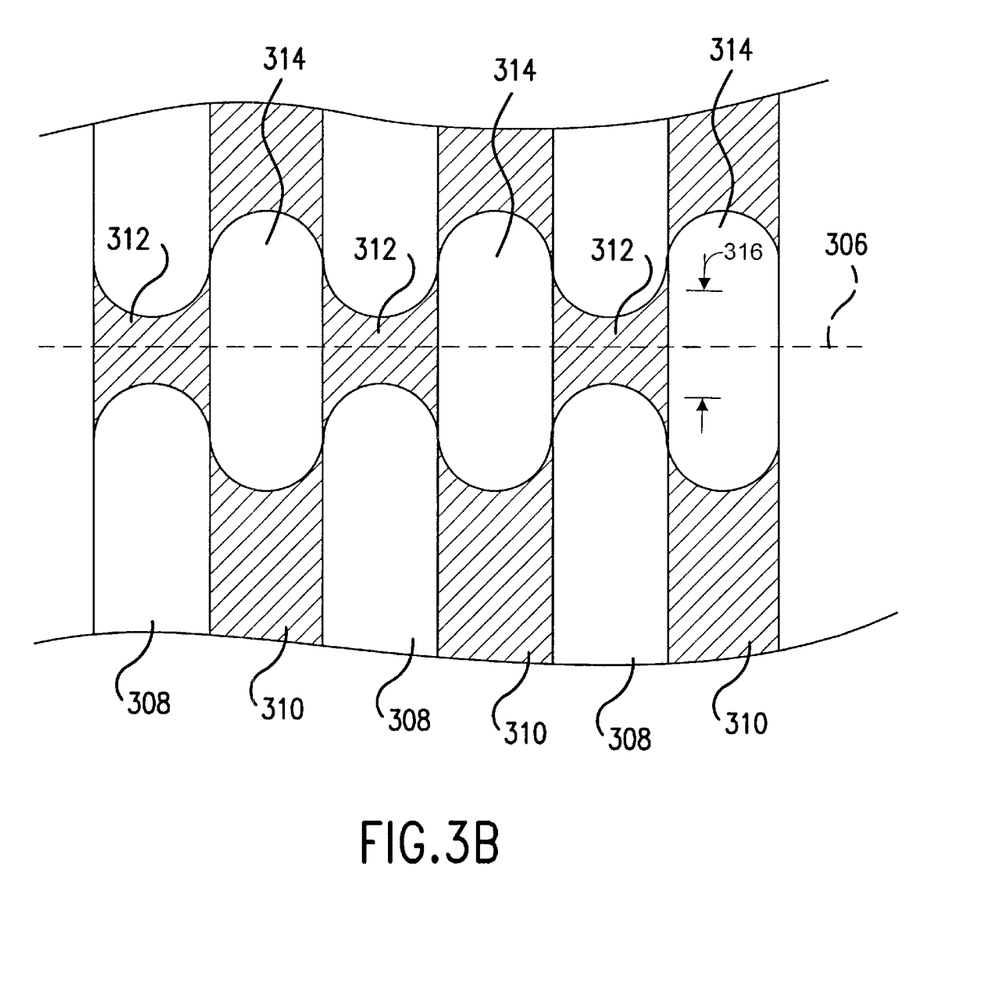
FIG. 3B is an expanded view of part of the optical disk of FIG. 3A.

FIG. 3B illustrates an expanded view of the area along a radial line 306 where the grooves and lands have steps in height. In FIG. 3B, cross-hatched areas depict surfaces on the recording thin film structure having the height defined as a land, and non-cross-hatched areas depict surfaces on the recording thin film structure having a height defined as a groove. Accordingly, reference number 308 designates grooves, and reference number 310 designates lands. Within a groove 308, along radial line 306, the height is changed to the height of a land, as designated by reference number 312. Within a land, along radial line 306, the height is changed to the height of a groove, as designated by reference number 314.

Preferably, the circumferential length of the central part of area 312 is less than the shortest length that can be resolved by the optical system, in order to minimize any effect on the data signal by the tilt detection feature. Writing and reading data is synchronized with a clock signal. A channel bit width is defined as a distance on the data surface determined by one data clock period times the circumferential velocity of the disk. For a disk using "8/16" modulation, the shortest mark that can be resolved by the optical system is about three times the channel bit width. For a 4.7 gigabyte DVD medium using "8/16" modulation, a channel bit width is 133 nanometers. For this case, the circumferential length of the central part of area 312 may be about two channel bit widths, or about 266 nanometers. For this case, the length of the shortest mark that can be resolved is illustrated by element 316.

Recall that the data signal is a sum (FIG. 1C, A+B+C+D) and recall that a focused laser spot centered on a groove overlaps onto the adjacent lands. The circumferential length of the land segments (area 314) adjacent to the tilt detection features in the groove, and with changed land height, is selected to further reduce any effect on the data signal by the tilt detection features. Since the intensity of the laser spot is substantially lower over the lands relative to the center of the spot, the circumferential length of each area 314 needs to be greater than the circumferential length of each area 312, such that the light reflected from two combined areas 314 on adjacent lands can compensate for any perturbation introduced into the sum data signal by area 312 on the groove. In the system illustrated in FIG. 3, the circumferential length of the central part of each area 314 is about 5.5 channel bit widths.

Figure 4:
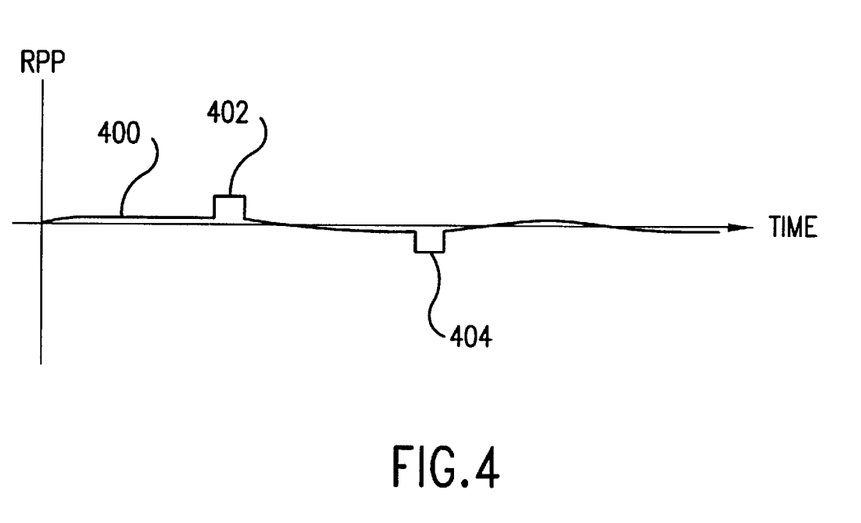
FIG. 4 is a graph of a tracking error signal as a function of time when using an optical disk in accordance with the invention.

FIG. 4 illustrates a radial push-pull signal (RPP) 400 as a function of time when using an optical disk as illustrated in FIGS. 3A and 3B. When a focused laser spot passes over an area 312 (FIG. 3) within a groove, a pulse (402, 404) in RPP indicates that the disk is radially tilted. The magnitude and direction of the pulse in RPP provide a measure of the magnitude and direction of radial tilt. After detection of tilt signals (402, 404), the RPP signal 400 may be low pass filtered to prevent the pulses from interfering with tracking offset control.

Optical disk systems commonly also derive a focus error signal from signals from the detector array (FIG. 1A, 114). However, the focus control, similarly as for tracking offset control, is much lower frequency than the data information, so that low pass filtering for the focus control also removes any high frequency steps resulting from the radial tilt measurement features (FIG. 3B, areas 312 and 314).

The radial tilt measurement features do not affect data writing. That is, when data is written, the tilt measurement features may be ignored, and data may be written over the tilt measurement features.

Figure 5A:
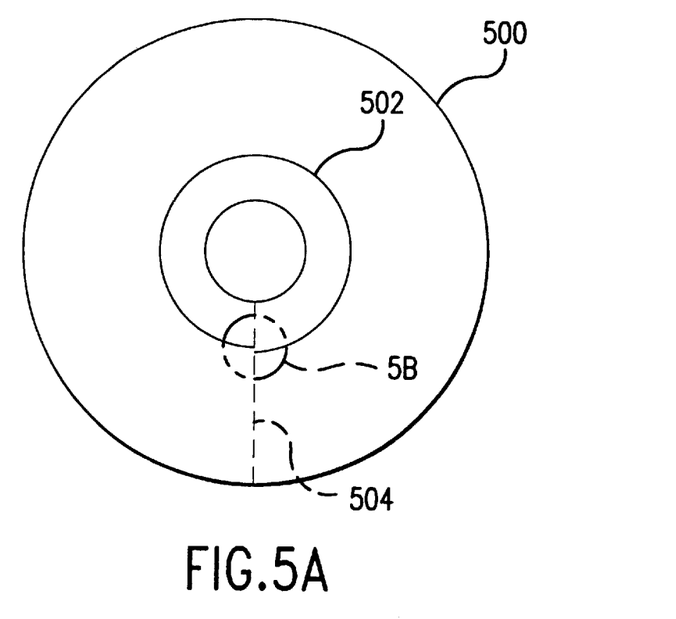
FIG. 5A is a plan view of an optical disk having an alternative track configuration.
Figure 5B:
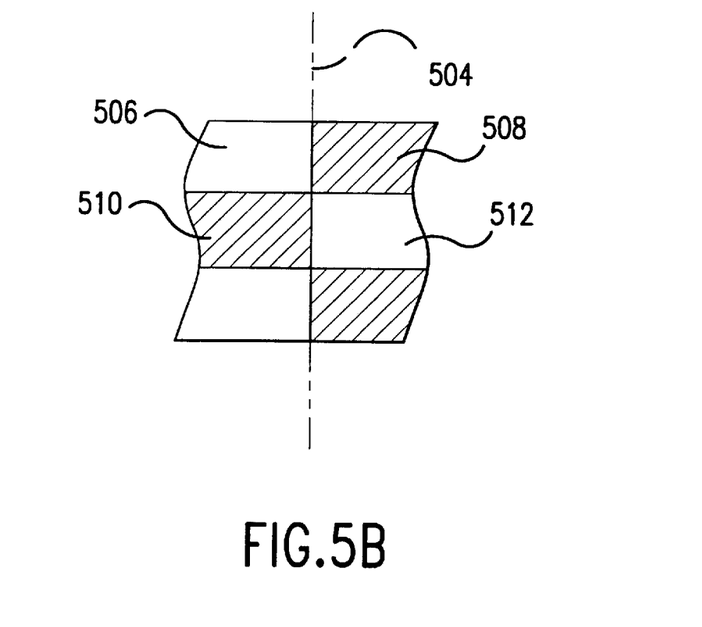
FIG. 5B is an expanded view of part of the optical disk of FIG. 5A.

In proposed single-spiral groove and land formats, for example DVD-RAM and ASMO, spiral tracks have a "switching point," at which the spiral track changes from a groove to a land or vice-versa. FIG. 5A illustrates a single-spiral groove and land disk 500 having a spiral track 502. The switching point is along a radial line 504. FIG. 5B provides additional detail of the switching point. In FIG. 5B, along radial line 504, groove 506 changes to a land 508, and land 510 changes to a groove 512. A disk as illustrated in FIGS. 5A and 5B may be designed so that a tracking error signal is insensitive to tilt when the focused laser spot is centered on a groove (or land). Referring to FIG. 2, if the disk is not tilted, switching from position 200 to position 202 does not result in a step in the tracking offset signal. However, if the disk is tilted, the switching point then provides a single abrupt step in the tracking error signal, once every revolution. For example, the tracking signal may exhibit a positive step when switching from a groove to a land, and then one revolution later the tracking signal may exhibit a negative step when switching from a land to a groove, if the disk is radially tilted. Alternatively, it may be preferable to design the disk so that when the focused spot is centered on a groove, the tracking error signal change for radial tilt is the same magnitude as the magnitude change when the focused spot is centered on a land, but opposite in direction. That is, in FIG. 2, curves S2 and S3 may be shifted horizontally so that, for example, at position 200, curve S2 is above curve S1 and curve S3 is below curve S1, and at position 202, curve S2 is below curve S1 and curve S3 is above curve S1, with the magnitudes of the differences equal. Then, an abrupt step in the tracking error signal occurs when the focused spot transitions from a groove to a land, and vice-versa, and if there is no radial tilt, the steps are equal in magnitude but opposite in direction. However, when the disk is radially tilted, the steps have unequal magnitude.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An optical disk medium comprising:

a data surface adapted to receive data marks, the data marks having a specified shortest data mark length;

at least one groove at a groove height, and lands at a land height adjacent to each groove;

a plurality of first areas, along a radial line on the disk, each first area in a groove, each first area having a height that is different than the groove height and having a circumferential length that is less than the specified shortest data mark length; and, a plurality of second areas, along the radial line, one second area on each land adjacent to each first area, each second area having a height that is different than the land height.

2. The optical disk of claim 1, wherein the height of each first area is the land height and the height of each second area is the groove height.

* * * * *